US006493734B1

(12) United States Patent
Sachs et al.

(10) Patent No.: US 6,493,734 B1
(45) Date of Patent: Dec. 10, 2002

(54) SYSTEM AND METHOD TO EFFICIENTLY GENERATE AND SWITCH PAGE DISPLAY VIEWS ON A PORTABLE ELECTRONIC BOOK

(75) Inventors: James Sachs, Menlo Park, CA (US); William S. Leshner, Carlsbad, CA (US); Brady Duga, Carlsbad, CA (US); Garth Conboy, La Jolla, CA (US); Andrew Marder, San Diego, CA (US); Thomas William Brown, Oceanside, CA (US)

(73) Assignee: Softbook Press, Inc., Menlo Park, CA (US)

( * ) Notice: Subject to any disclaimer, the term of this patent is extended or adjusted under 35 U.S.C. 154(b) by 0 days.

(21) Appl. No.: 09/419,554

(22) Filed: Oct. 15, 1999

(51) Int. Cl.[7] ............................................. G06F 17/21
(52) U.S. Cl. ....................................... 707/526; 707/530
(58) Field of Search ................................ 705/500, 501, 705/513, 526, 527, 530; 345/326

(56) References Cited

U.S. PATENT DOCUMENTS

| | | | | |
|---|---|---|---|---|
| 5,367,621 A | | 11/1994 | Cohen et al. ................ | 707/501 |
| 5,475,399 A | | 12/1995 | Borsuk ......................... | 345/130 |
| 5,524,201 A | | 6/1996 | Shwarts et al. .............. | 345/326 |
| 5,663,748 A | * | 9/1997 | Huffman et al. ............. | 345/173 |
| 5,697,793 A | * | 12/1997 | Huffman et al. ............. | 434/317 |
| 5,761,485 A | * | 6/1998 | Munyan ....................... | 345/350 |
| 5,802,516 A | * | 9/1998 | Shwarts et al. .............. | 707/6 |
| 5,835,905 A | * | 11/1998 | Pirolli et al. ................. | 707/3 |
| 5,893,132 A | * | 4/1999 | Huffman et al. ............. | 707/532 |
| 5,956,034 A | * | 9/1999 | Sachs et al. ................. | 345/350 |
| 5,957,697 A | * | 9/1999 | Iggulden et al. ............. | 434/317 |
| 5,986,690 A | * | 11/1999 | Hendricks .................... | 348/7 |
| 6,091,930 A | * | 7/2000 | Mortimer et al. ........... | 434/362 |
| 6,138,157 A | * | 10/2000 | Welter et al. ................ | 709/224 |
| 6,154,736 A | * | 11/2000 | Chickering et al. .......... | 706/59 |

OTHER PUBLICATIONS

Simpson, *Mastering WordPerfect® 5.1 & 5.2 for Windows™*, SYBEX Corporation, 1993, pp. 404–406.*
Elaine Weinmann, *QuarkXpress for MacIntosh 3.2, Visual Quickstart Guide*, 1993, Peachpit Press, Inc., pp. 125–134.*

* cited by examiner

Primary Examiner—Stephen S. Hong
(74) Attorney, Agent, or Firm—Townsend & Townsend & Crew LLP

(57) ABSTRACT

The present invention provides a system and method to efficiently generate and switch page display views on a portable electronic book. The method includes generating an ebook binary file including a plurality of book views, each of the plurality of book views including information needed to generate page display images representing content of a reading material in a font having a particular font point size. The method further includes parsing the ebook binary file and generating the page display images representing content of a reading material.

31 Claims, 9 Drawing Sheets

US 6,493,734 B1

SYSTEM AND METHOD TO EFFICIENTLY GENERATE AND SWITCH PAGE DISPLAY VIEWS ON A PORTABLE ELECTRONIC BOOK

FIELD OF THE INVENTION

This invention relates generally to portable electronic books, and particularly to a system and method to efficiently generate and switch page display views on a portable electronic book.

BACKGROUND OF THE INVENTION

Advances in computer and communication technology have provided consumers or users a convenient and economical way to access information in a variety of media. One particular area of information access includes electronic books. An electronic book is a virtual device that receives documents, publications, or reading materials downloaded from an information network. Users of an electronic book can read downloaded contents of documents, publications, or reading materials subscribed from a participating bookstore at his or her own convenience without the need to purchase printed version. When reading the documents, publications, or reading materials, users of an electronic book may wish to scale the pages of the reading materials up or down depending on the users' preferences. Accordingly, it is highly desirable to include a view switching feature to allow users to increase or decrease size of page display images or visual representations of pages of the reading material.

SUMMARY OF THE INVENTION

The present invention provides a system and method to efficiently generate and switch page display views on a portable electronic book.

The method includes generating an electronic book (ebook) binary file including a plurality of book views, each of the plurality of book views including information needed to generate page display images representing content of a reading material in a font having a particular font point size. The method further includes parsing the ebook binary file and generating the page display images representing content of a reading material.

The above described and many other features of the present invention will become apparent as the invention becomes better understood by reference to the following detailed description when considered in conjunction with the accompanying drawings.

DETAILED DISCLOSURE OF THE EMBODIMENTS

In the following description, numerous details are merely set forth to illustrate inventive aspects of the present invention and to provide a thorough understanding of the present invention. However, it will be apparent to one skilled in the art that these specific details may not be required in order to practice the present invention. In other instances, well-known electrical structures and circuits and software modules are shown in block diagram form to avoid obscuring the present invention.

Also in the following description, "electronic publications", "electronic documents", and "electronic text" are used interchangeably and generally to refer to reading materials that can be read by individuals or users. "Remote viewing system", "portable viewer", "electronic book", and "display device" refer to a system for viewing reading materials. "User interface", "navigation", "control", and "manipulation" refer to methods for controlling the environment of the reading materials. A "page displaying image" is an arrangement of pixels on a display screen or an output device to create a visual representation of a page of reading material. "Rendering" and "imaging" refer to the act of arranging pixels of on an output device to create a page display image.

Typical applications may include reading materials that are of such a time-sensitive nature that publication and distribution via conventional distribution channels are not practical. Other applications may include materials consisting of a collection of text from numerous sources which are compiled in such a way as to provide value to the users or readers, materials currently out of print, and materials of highly specialized interest, limited interest or of unknown interest so as to not justify publication in printed form.

Figure 1:
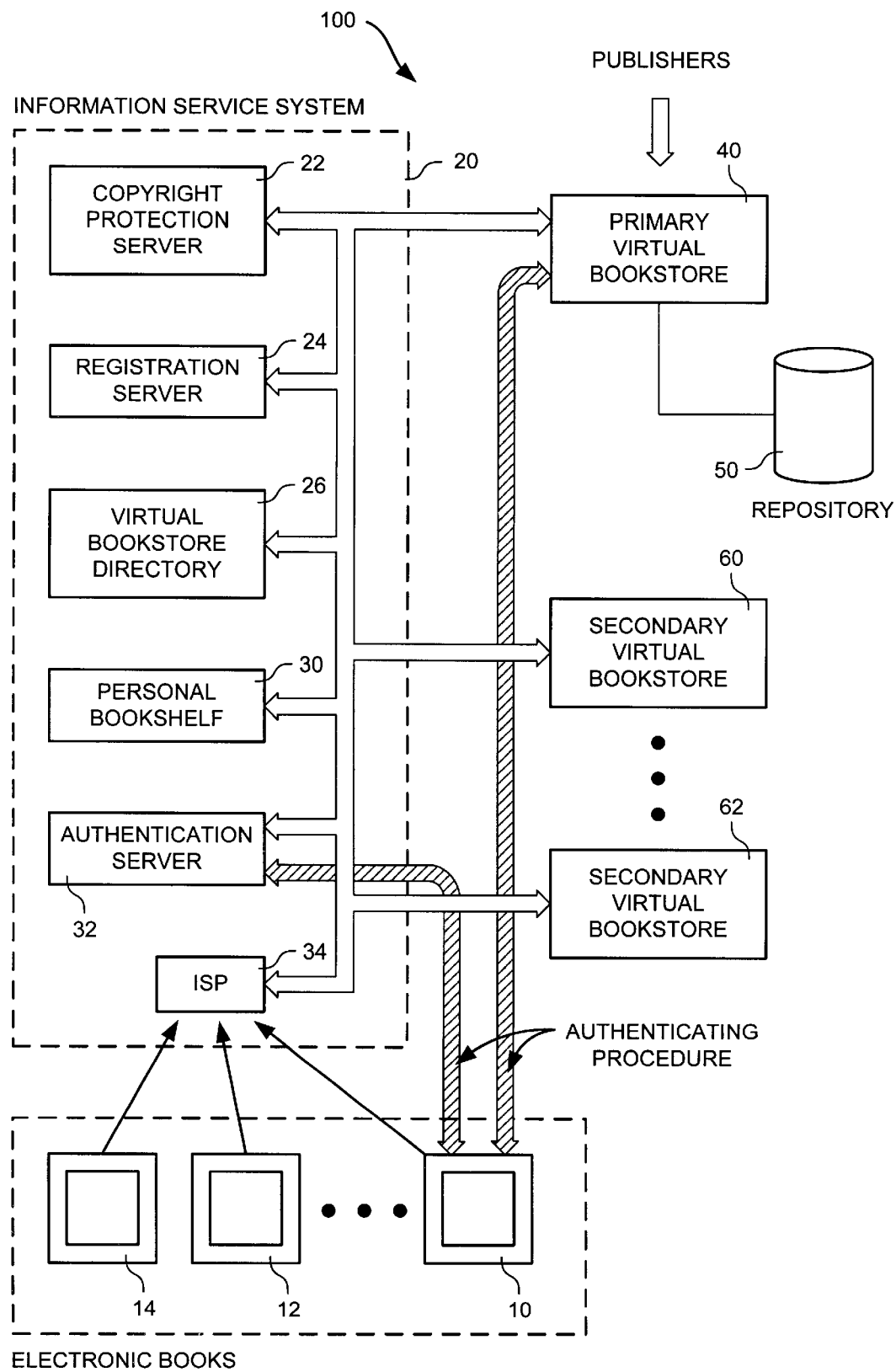
FIG. 1 is a diagram illustrating a system 100 in which one embodiment of the present invention can be practiced.

FIG. 1 is a diagram illustrating a system 100 in which one embodiment of the present invention can be practiced. Referring to FIG. 1, the system 100 comprises: (a) at least one portable electronic book 10 operative to request an electronic document or publication from a catalog of distinct electronic reading materials, and to receive and display the requested electronic document or publication; (b) an information services system 20 which includes an authentication server 32 for authenticating the identity of the requesting portable electronic book 10 and a copyright protection server 22 for rendering the requested electronic document or publication sent to the requesting portable electronic book 10 readable only by the requesting portable electronic book 10; (c) at least one primary virtual bookstore 40 in electrical communication with the information services system 20, the primary virtual bookstore being a computer-based storefront accessible by the portable electronic book and including the catalog of distinct electronic reading materials; and (d) a repository 50 in communication with the primary virtual bookstore 40, for storing the distinct electronic reading materials listed in the catalog.

The system preferably includes more than one portable electronic book 10, to be commercially viable. This is illustrated in FIG. 1 by including the portable electronic books 12 and 14. The system also preferably includes more than one primary virtual bookstore 40, each serving a different set of customers, each customer owning a portable electronic book.

In one embodiment of the invention, the system 100 further comprises a secondary virtual bookstore 60 in communication with the information services system 20. In this case, the information services system also includes a directory of virtual bookstores 26 in order to provide the portable electronic book 10 with access to the secondary virtual bookstore 60 and its catalog of electronic reading materials.

The information services system 20 can optionally include a notice board server 28 for sending messages from one of the virtual bookstores, primary or secondary, to a portable electronic book in the system.

The information services system 20 also includes a registration server 24 for keeping track of the portable electronic books that are considered active accounts in the system and for ensuring that each portable electronic book is associated with a primary virtual bookstore in the system. In the case where the optional notice board server 28 is included in the information services system 20, the registration server 24 also allows each portable electronic book user to define his or her own notice board and document delivery address.

The information services system 20 preferably comprises a centralized bookshelf 30 associated with each portable electronic book 10 in the system. Each centralized bookshelf 30 contains all electronic reading materials requested and owned by the associated portable electronic book 10. Each portable electronic book 10 user can permanently delete any of the owned electronic reading materials from the associated centralized bookshelf 30. Since the centralized bookshelf 30 contains all the electronic reading materials owned by the associated portable electronic book 10, these electronic reading materials may have originated from different virtual bookstores. The centralized bookshelf 30 is a storage extension for the portable electronic book 10. Such storage extension is needed since the portable electronic book 10 has limited non-volatile memory capacity.

The user of the portable electronic book 10 can add marks, such as bookmarks, inking, highlighting and underlining, and annotations on an electronic publication, document, or reading material displayed on the screen of the portable electronic book, then stores this marked reading material in the non-volatile memory of the electronic book 10. The user can also upload this marked reading material to the information services system 20 to store it in the centralized bookshelf 30 associated with the portable electronic book 10, for later retrieval. It is noted that there is no need to upload any unmarked reading material, since it was already stored in the centralized bookshelf 30 at the time it was first requested by the portable electronic book 10.

The information services system 20 further includes an Internet Services Provider (ISP) 34 for providing Internet network access to each portable electronic book in the system.

Figure 3:
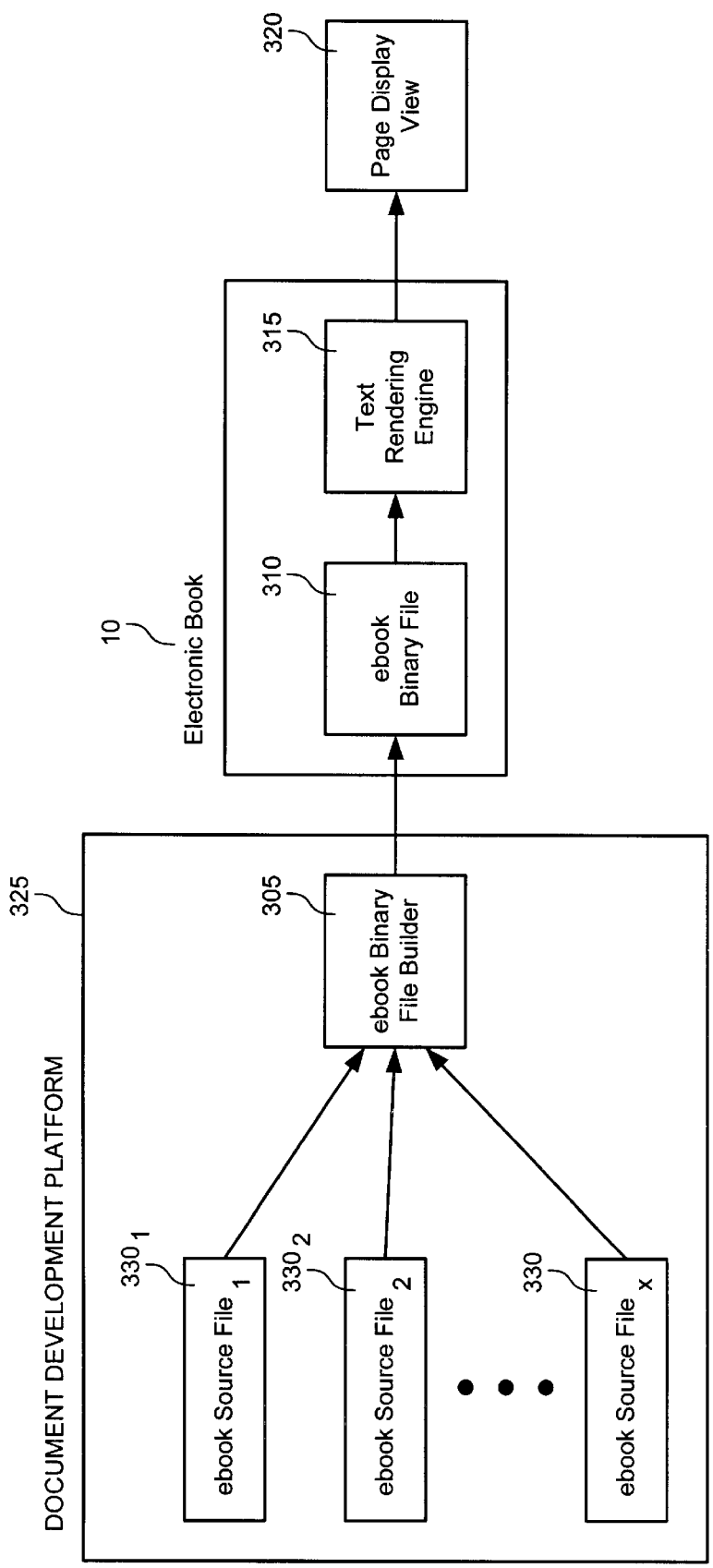
FIG. 3 is a block diagram illustrating generally components or modules that are used to support the generating and switching of page display views in accordance with the current invention.

FIG. 1 further illustrates that the primary virtual bookstore 40 and the secondary virtual bookstore 60 interact with a document development platform 321, shown in FIG. 3. The document development platform 325 is generally a computing device that includes a processing unit to process data. A processing unit may generally be a central processing unit (CPUs), a micro-controller, a field programmable logic array (FPLA), a field programmable gate array (FPGA), or any combinational logic circuitry capable of processing data. Examples of a document development platform 325 may include a desktop computer, a notebook, a mid-range workstation, a handheld device, or the like. The document development platform 325 generates ebook binary files to be transmitted to the information service system 20 for downloading to the electronic books 10, 12, and 14. A detailed description of an ebook binary file will be provided below.

Figure 2:
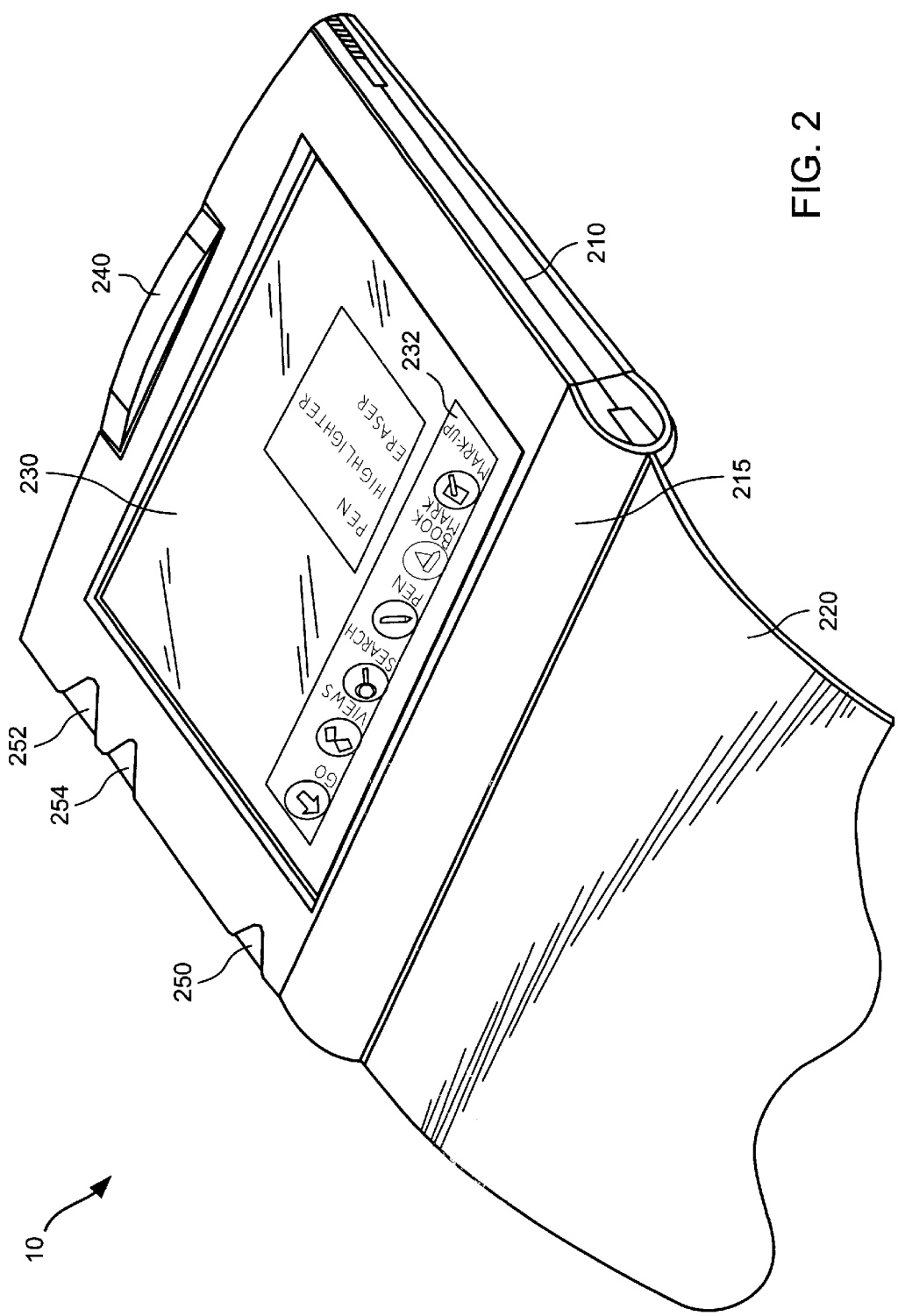
FIG. 2 is a diagram illustrating an electronic book 10 in accordance with one embodiment of the present invention.

FIG. 2 is a diagram illustrating an electronic book 10 in accordance with one embodiment of the present invention. The electronic book 10 includes a housing 210, a battery holder 215, a cover 220, a display screen 230, a page turning mechanism 240, a menu key 250, a bookshelf key 252, and a functional key 254.

The housing 210 provides overall housing structure for the electronic book. This includes the housing for the electronic subsystems, circuits, and components of the overall system. The electronic book is intended for portable use; therefore, the power supply is mainly from batteries. The battery holder 215 is attached to the housing 210 at the spine of the electronic book 10. Other power sources such as AC power can also be derived from interface circuits located in the battery holder 215. The cover 220 is usually made by flexible material and is attached to the housing 210. The cover is used to protect the viewing area 230.

The display screen 230 provides a viewing area for the user to view the electronic reading materials retrieved from the storage devices or downloaded from the communication network. The display screen 230 may be sufficiently lit so that the user can read without the aid of other light sources. When the electronic book is in use, the user interacts with the electronic book via a soft menu 232. The soft menu 232 displays icons allowing the user to select functions. Examples of these functional icons include go, views, search, pens, bookmarks, markups, and close. Each of these icons may also include additional items. These additional items are displayed in a drop-down tray when the corresponding functional icon or key is activated by the user. An example of a drop-down tray is the pens tray which includes additional items such as pen, highlighter, and eraser. In one embodiment, the soft menu 232 can be updated dynamically and remotely via the communication network.

The page turning mechanism 240 provides a means to turn the page either backward or forward. The page turning mechanism 240 may be implemented by a mechanical element with a rotary action. When the element is rotated in one direction, the electronic book will turn the pages in one direction. When the element is turned in the opposite direction, the electronic book will also turn in the opposite direction. In one embodiment, the page turner mechanism 240 may also be used as a latch to hold the cover 220 in place when the electronic book is closed.

The menu key 250 is used to activate the soft menu 232 and to select the functional icons. The bookshelf key 255 is used to display the contents stored in the bookshelf and to activate other bookshelf functions. The functional key 254 is used for other functions.

The electronic book 10 includes a view switching feature which allows readers or users to increase or decrease the size of the font used to create page display images to suit the preferences of the readers or users. As stated above, a page display image is an arrangement of pixels on a display screen or an output device to create a visual representation of a page of reading material. Each set of page display images of an electronic publication, document, or reading material that is generated using a set of view parameters is referred to as a page display view. In one embodiment, view parameters can include the point size of the font that should be used to create page display images. In another embodiment, view parameters can also include the dimensions of a display screen or a portion of a display screen of the electronic book where page display images are presented.

In one embodiment, the electronic book 10 supports two different page display views, such that page display images of the first view are generated using a smaller font than page display images of the second view. In practice, the electronic book 10 can be constructed to support more than two different page display views. The following figures and their accompanying description describe a system and method to efficiently generate and switch page display views.

FIG. 3 is a block diagram illustrating generally components or modules that are used to support the generating and switching of page display views in accordance with the current invention. As shown in FIG. 3, electronic book (ebook) binary file builder 305 accepts as input one or more ebook source files $330_1$, $330_2$, $330_x$ (where x is a positive integer) describing or defining an electronic publication, document, or reading material. In one embodiment, ebook source files $330_1$, $330_2$, and $330_x$ are constructed using a format that is consistent with the "Open eBook™ Publication Structure" specification published by the Open eBook™ Authoring Group. However, ebook source files $330_1$, $330_2$, $330_x$ can be constructed using other well-known document publishing formats, e.g., rich text format (rtf).

Figure 4:
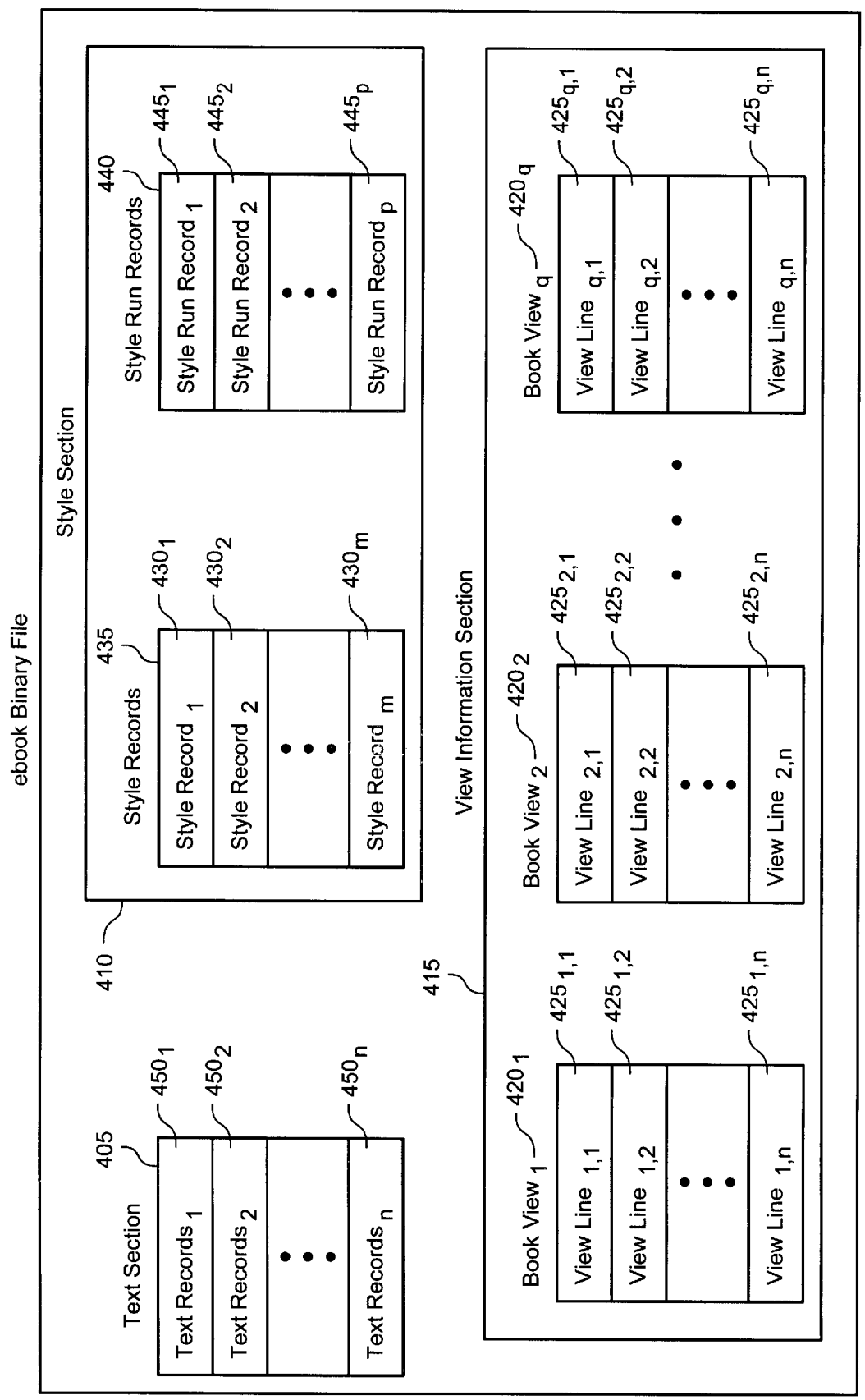
FIG. 4 illustrates one embodiment of an ebook binary file in accordance with the current invention.

The ebook binary file builder 305 (i) parses ebook source files $330_1$, $330_2$, $330_x$ describing or defining an electronic publication, document, or reading material, (ii) extracts text flow information in the ebook source files, (iii) organizes the extracted text flow information into text section 405, style section 410, and view information section 415, and (iv) stores the extracted and organized text flow information sections 405, 410, 415 in an ebook binary file 310, as shown in FIG. 4.

In one embodiment, text flow information may include textual content, text style information, margin and indent definitions, text color information, and any other information needed to build page display images for an electronic publication, document, or reading material. Text flow information may also include data pertaining to graphics or images to be presented in a page. The graphics or images data may include the identification of the graphics or images and positioning information specifying where the graphics or images should be placed on a page. The layout of the ebook binary file 310 and the text flow information sections 405, 410, 415 stored in the file 310 will be described below in more detail.

After its creation, the ebook binary file 310 can then be transferred to the electronic book 10 via the system 100, as shown in FIG. 1 and discussed above in the description accompanying FIG. 1. Once transferred to the electronic book 10, the ebook binary file 310 can be fed as input into the text rendering engine 315. The text rendering engine 315 parses the ebook binary file 310 and generates page display views 320. As defined above, a page display view is a set of page display images of an electronic publication, document, or reading material that is generated using a set of view parameters, which can include the point size of a base font or dimensions of a display screen or a portion of a display screen of the electronic book where page display images are presented.

The tasks of parsing ebook source files $330_1$, $330_2$, $330_x$ and extracting and organizing text flow information are required in the process of generating page display images from ebook source files $330_1$, $330_2$, $330_x$. By performing these tasks, the ebook binary file builder 305 reduces the work load of the text rendering engine 315. Furthermore, in one embodiment illustrated in FIG. 3, the ebook binary file builder 305 resides in the document development platform 325, and the text rendering engine 315 resides in the electronic book 10. In this embodiment, the ebook binary file builder 305 does not use the computing capabilities of the electronic book 10 to 10 parse the ebook source files $330_1$, $330_2$, $330_x$ to create an ebook binary file 310. Rather, the ebook binary file builder 305 uses the computing capabilities of the document development platform 325. Since the ebook binary file builder 305 uses the computing capabilities of the document development platform 325 to ease the work load of the text rendering engine 315, the text rendering engine 315 can generate page display images in different page display views for documents, books, or reading materials at a relatively fast speed that is generally acceptable to the readers or users.

It should be noted that the ebook binary file builder 305 and the text rendering engine 315 can be implemented as software modules embodied on a computer readable medium. Examples of such computer readable medium include volatile or non-volatile memory, magnetic tapes, compact disk read only memory (CDROM), floppy diskette, hard disk, optical disk, etc.

FIG. 4 illustrates one embodiment of an ebook binary file 310 in accordance with the current invention. The ebook binary file 310 includes a text section 405, which generally stores the textual content of a document, book, or reading material. The textual content generally comprises numerous text segments. Each of the text segments comprises one or more alphanumeric characters, and is stored contiguously in a text record $450_1$, $450_2$, $450_p$ (where p is a positive integer) in the text section 405.

Figure 8:
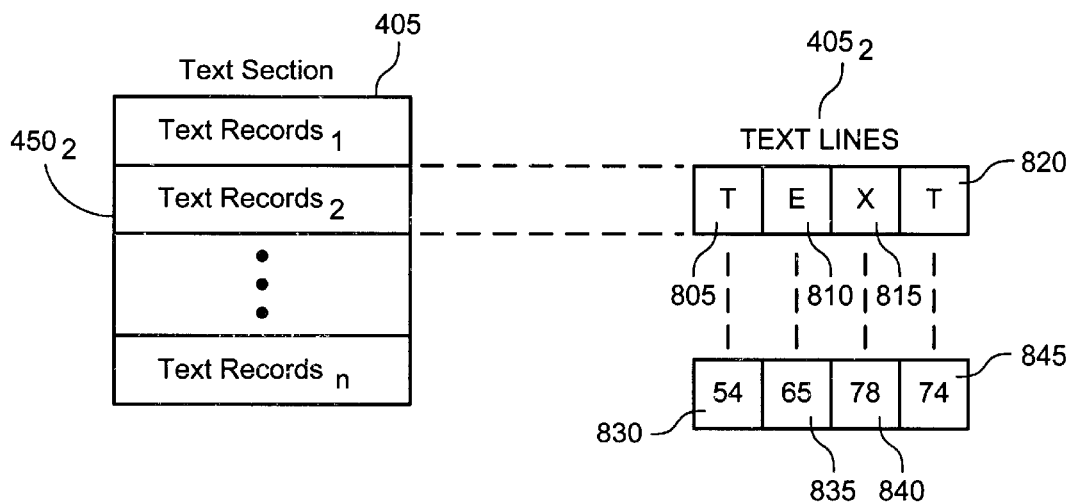
FIG. 8 illustrates one embodiment of a text record in accordance with the current invention.

FIG. 8 illustrates one embodiment of a text record in accordance with the current invention. The exemplary text record 4052 stores an exemplary text segment having four characters, 'T' 805, 'E' 810, 'X' 815, and 'T' 820. In the embodiment shown in FIG. 8, the ASCII codes 830, 835, 840, 845 of the four characters are stored in the text record $405_2$. It should be noted that other sets of character codes, such as EBCDIC, can be used to represent text segments in the text records.

Returning to FIG. 4, the ebook binary file 310 also includes a view information section 415 comprising two or more book view sections $420_1$, $420_2$, $420_q$ (where q is a positive integer). Each book view section $420_1$, $420_2$, $420_q$ is generated to support one page display view. Each book view section $420_1$, $420_2$, $420_q$ includes a plurality of view lines $425_{1,1}$, $425_{1,2}$, $425_{1,n}$, $425_{2,1}$, $425_{2,2}$, $425_{2,n}$, $425_{q,1}$, $425_{q,2}$, $425_{q,n}$ (where q, as stated above, is a positive integer and x is also a positive integer). Each view line corresponds to a text record $450_1$, $450_2$, $450_p$ in the text section 405, and generally contains information needed to image or render text segments stored in corresponding text record $450_1$, $450_2$, $450_p$.

Figure 5A:
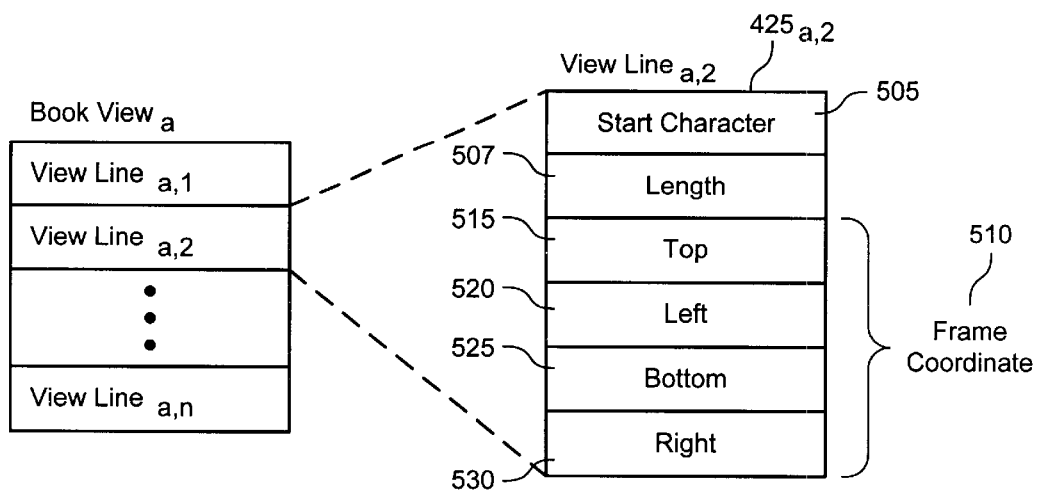
FIG. 5A shows one embodiment of a view line in accordance with the current invention.

FIG. 5A shows one embodiment of a view line $425_{a,2}$ (where 'a' is a positive integer) in accordance with the current invention. The information needed for imaging or rendering is stored in the start character 505 and frame coordinate 510 fields of the view line $425_{a,2}$. Start character 505 specifies an offset from the beginning of the text section to the first character in a text record corresponding to the particular view line $425_{a,2}$. Length field 507 indicates the length of the text segment stored in the text record corresponding to the particular view line $425_{a,2}$. Frame coordinate 510 has four sub-fields, including top 515, left 520, bottom 525, and right 530, to store the coordinate of a frame of a line of displayed text. A frame of a line of displayed text can be generally defined as a bounding rectangular box in which the line of displayed text is placed.

Figure 5B:
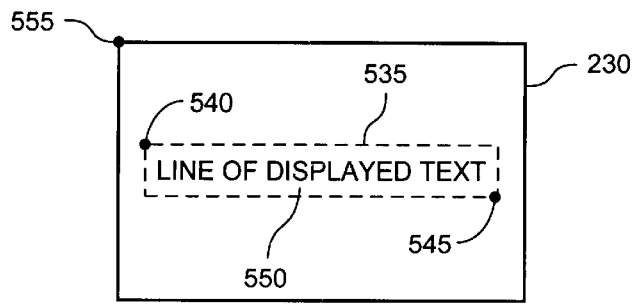
FIG. 5B illustrates an exemplary frame for a line of displayed text in accordance with the current invention.

FIG. 5B illustrates an exemplary frame 535 for a line of displayed text 550 in accordance with the current invention. The top and left sub-fields 515, 520 of the view line $425_{a,2}$, as shown in FIG. 5A, contain the (top, left) coordinate 540 of the frame 535 of the line of displayed text 550, as shown in FIG. 5B. The bottom and right sub-fields 525, 530 of a view line $425_{a,2}$, as shown in FIG. 5A, contain the (bottom, right) coordinate 545 of the frame 535 shown in FIG. 5B. In one embodiment, the (top, left) 540 and (bottom, right) 545 coordinates of the frame are defined in relation to the origin 555, or the top, left corner 555, of the page 230 or the display screen 230.

Figure 5C:
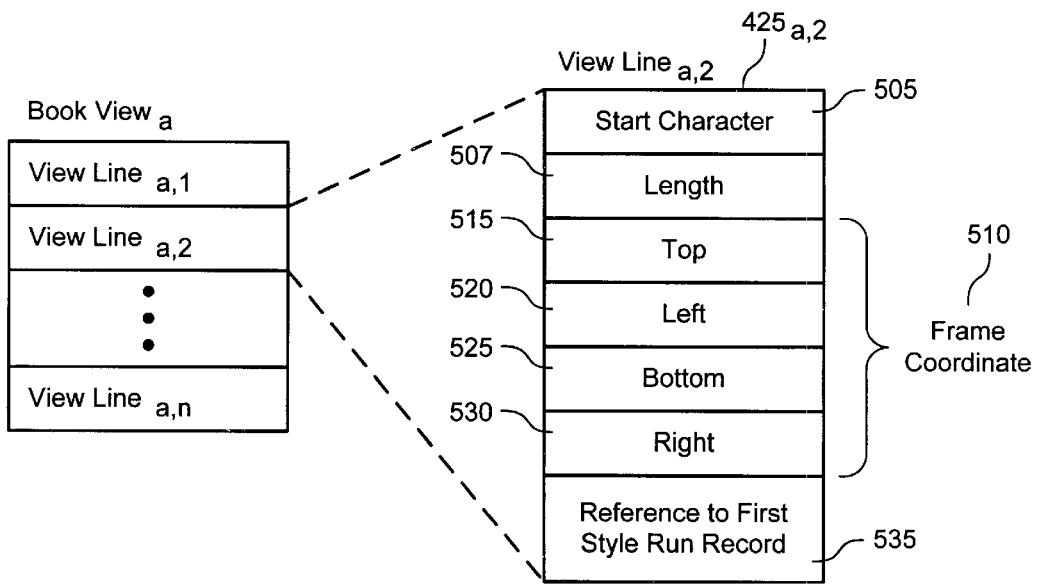
FIG. 5C shows an alternative embodiment of a view line in accordance with the current invention.

FIG. 5C shows an alternative embodiment of a view line $425_{a,2}$ in accordance with the current invention. In this alternative embodiment, the view line $425_{a,2}$ contains a start style run field 535, which is a reference to a corresponding style run record (shown in FIG. 7 and discussed below in more detail below in the description accompanying FIG. 7). The inclusion of the start style run field 535 in the view line provides quick access to the corresponding style run record.

Returning to FIG. 4, the ebook binary file also includes a style section 410, which generally stores (1) sets of text style information for the text records in the text section, and (2) data records mapping those sets of text style information to corresponding text records. Each set of text style information is stored in one style record $430_1$, $430_2$, $430_m$ (where m is a positive integer) in the style section 410. In order to be efficient with storage space, the style section 410 stores only sets of information defining unique text styles which have not already been defined and stored in the style section 410.

It should be noted that each style record $430_1$, $430_2$, $430_m$ in the style section corresponds to one or more text records in the text section 410. The style record $430_1$, $430_2$, $430_m$ dictates how the text rendering engine 315 (shown in FIG. 3) should render or image the text segment(s) stored in the text record(s) corresponding to the style record.

Figure 6A:
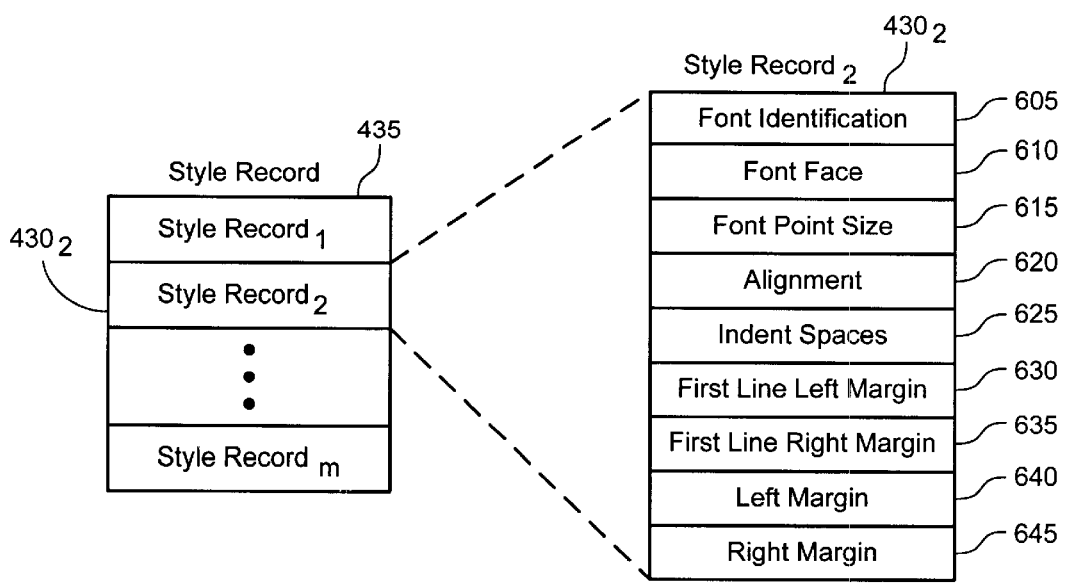
FIG. 6A illustrates one embodiment of a style record in accordance with the current invention.

FIG. 6A illustrates one embodiment of a style record $430_2$ in accordance with the current invention. In this embodiment, the style record $430_2$ includes fields indicating basic style information. These fields include font identification 605, font face 610, font point size 615, and alignment 620. Font identification 605 contains a unique positive integer assigned to a font residing in the electronic book so that the font can be identified. Font face 610 specifies the type face of a font, e.g., bold, italicized, etc. Font point size 615 indicates the base or default point size of the font that should be used to render the text segment stored in the text record corresponding to the style record $430_2$. Alignment 620 specifies whether the corresponding text record should be centered, justified, left aligned, or right aligned.

The style record also has fields containing indent and margin information. These fields include indent spaces 625, first line left margin 630, first line right margin 635, left margin 640, and right margin 645. The indent spaces field 625 specifies the number of spaces that must be inserted before the first text segment in a paragraph. The first line left margin 630 and first line right margin 635 fields indicate respectively the left and right margins of the first text segment in a paragraph. The left margin 640 and right margin 645 fields define respectively the left and right margins of text segments that are not the first text segment in a paragraph.

It should be noted that in one embodiment, the margin fields 630, 635, 640, 645 are expressed in terms of pixels. However, in practice, these margin fields 630, 635, 640, 645 can be expressed in any unit of measurement, e.g., inches, centimeters, etc.

Figure 6B:
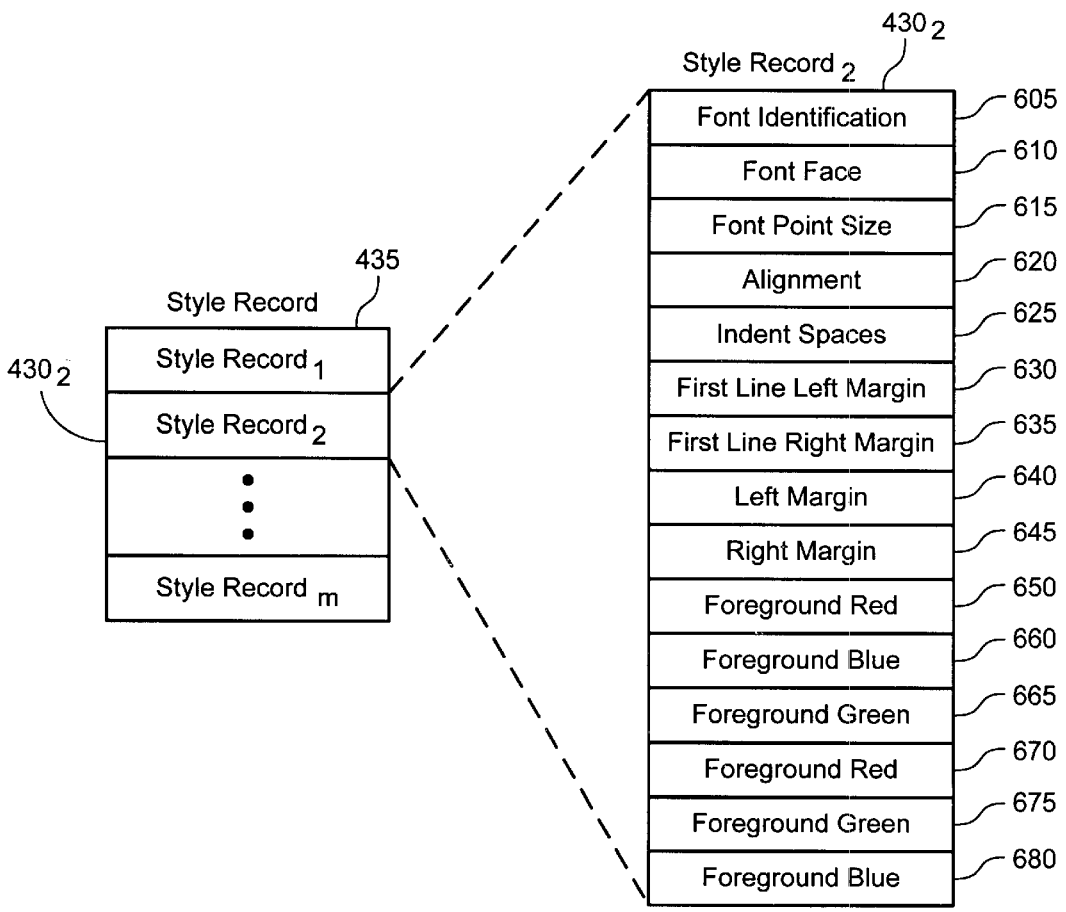
FIG. 6B shows an alternative embodiment of a style record in accordance with the current invention.

FIG. 6B shows an alternative embodiment of a style record $430_2$ in accordance with the current invention. In this alternative embodiment, the style record $430_2$ contain fields relating to text color information, including foreground red 650, foreground green 660, foreground blue 665, background red 670, background green 675, and background blue 680. The foreground red 650, foreground green 660, and foreground blue 665 fields define the foreground color of the text record corresponding to the style record $430_2$. The background red 670, background green 675, and background blue 680 fields define the background color of the corresponding text record.

Returning to FIG. 4, the style section 410 also includes style run records $445_1$, $445_2$, $445_p$ (where p is a positive integer). Style run records $445_1$, $445_2$, $445_p$ generally maps text records in the text section to corresponding style records in the style section. Style run records $445_1$, $445_2$, $445_p$ are generally employed to save storage space.

As described above, the style records contain information that the text rendering engine 315 (shown in FIG. 3) needs to know to render or image text record or text records corresponding to the style records. It should be noted that each text record can correspond to one or more style records.

An alternative approach to using style run records $445_1$, $445_2$, $445_p$ is to create one or more style records for every text record. However, this alternative approach can result in storing a substantial number of identical style records that define identical text styles since text styles for text records are often repetitive. Therefore, the approach of storing only unique style records (as described above) and creating style run records $445_1$, $445_2$, $445_p$ to map text records to corresponding style records saves storage space since style run records $445_1$, $445_2$, $445_p$ are substantially smaller in size than style records.

Figure 7:
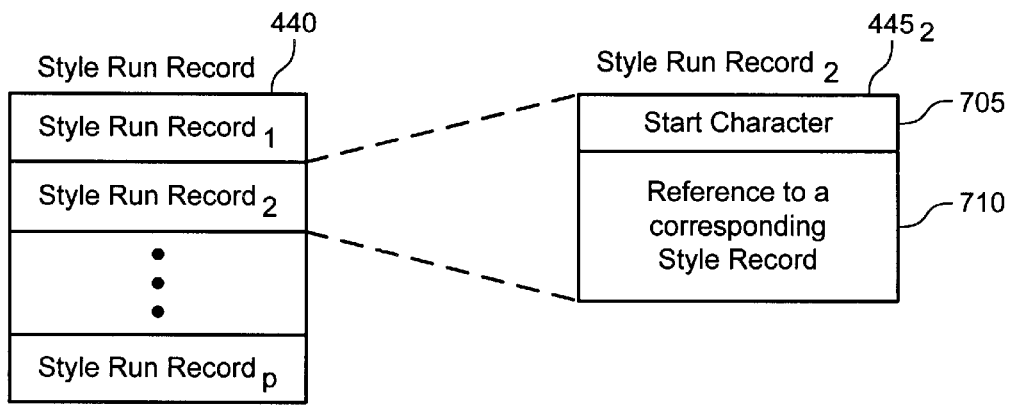
FIG. 7 illustrates one embodiment of a style run record $445_2$ in accordance with the current invention.

FIG. 7 illustrates one embodiment of a style run record $445_2$ in accordance with the current invention. The style run record $445_2$ includes a start character 705 field and a field 710 containing a reference to a style record. The start character field 705 in the style run record $445_2$ indicates the offset from the beginning of the text section to a text record corresponding to the style run record. The field 710 containing the reference to a style record is used to access the style record applicable to the text record corresponding to style run record $445_2$. As described above, the applicable style record dictates how the text rendering engine 315 (shown in FIG. 3) should render or image the text segment (s) stored in the text records(s) corresponding to the style record.

Figure 9:
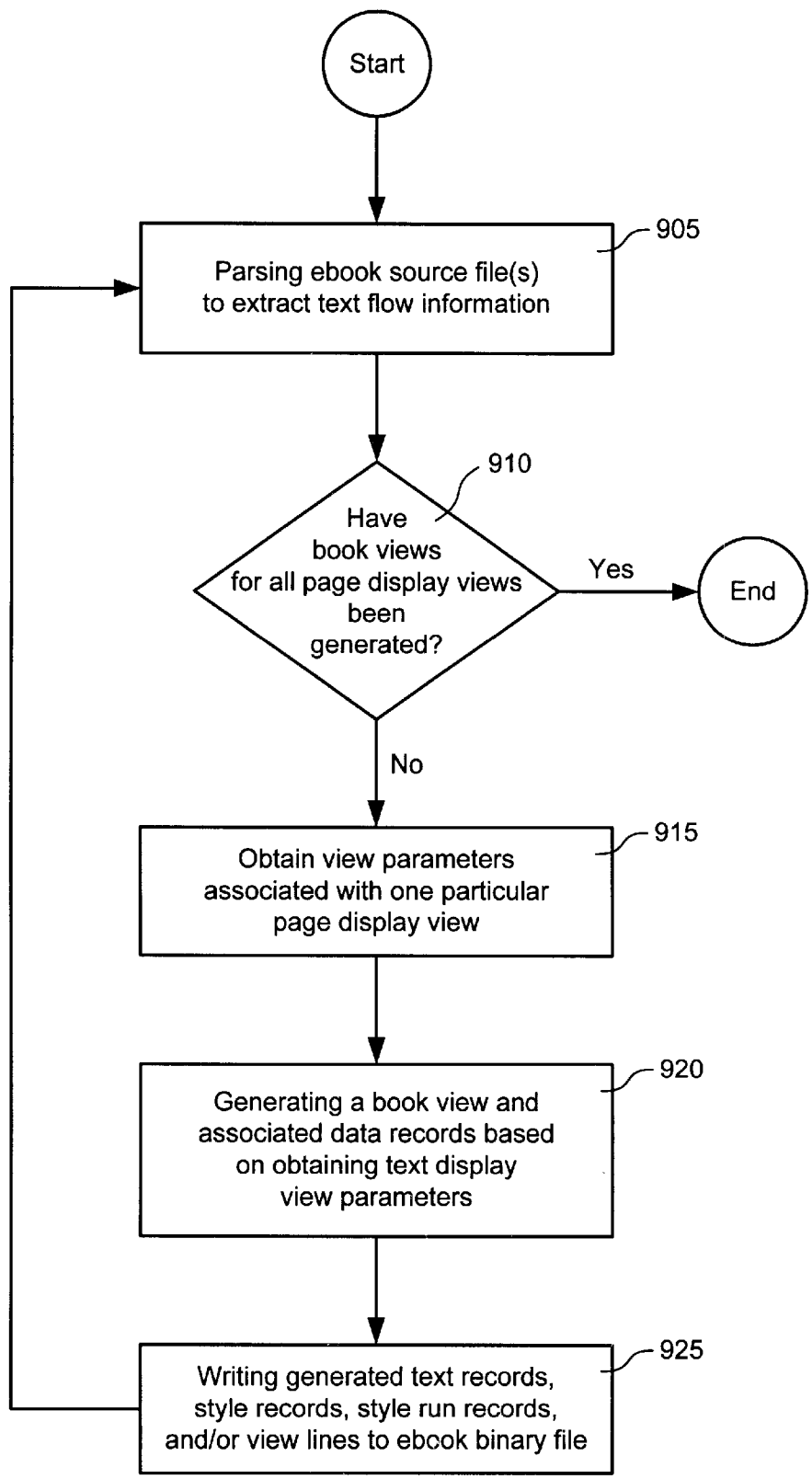
FIG. 9 outlines the process of creating an ebook binary file from one or more ebook source files in accordance with the current invention.

FIG. 9 generally outlines the process of creating an ebook binary file from one or more ebook source files in accordance with the current invention. In block 905, the ebook source files containing text flow information are parsed, and text flow information is extracted from the ebook source files. As described above, text flow information may include the text segments, text style information, margin and indent definitions, text color information, and any other information required in building page display images for a book, document, or reading material.

In block 910, a query is performed to determine whether book views for all page display views have been generated. As stated above, there can be two or more different page display views supported. One book view needs to be created for each of the different page display view. If book views for all different page display views have been generated, the process of creating the ebook binary file is finished. Otherwise, view parameters associated with a particular page display view are obtained or selected (block 915). In one embodiment, view parameters can include the point size of a font that should be used to generate the particular page display view. In an alternative embodiment, view parameters can also include the dimensions of the screen display or a portion of the display screen of the electronic book where page display images are presented.

Book views and associated data records, including text records, style records, and style run records, are generated based on the view parameters (block 920), and written to the ebook binary file (block 925). Blocks 910 to 925 are then repeated until book views for all page display views are generated and written to the ebook binary file.

Figure 10:
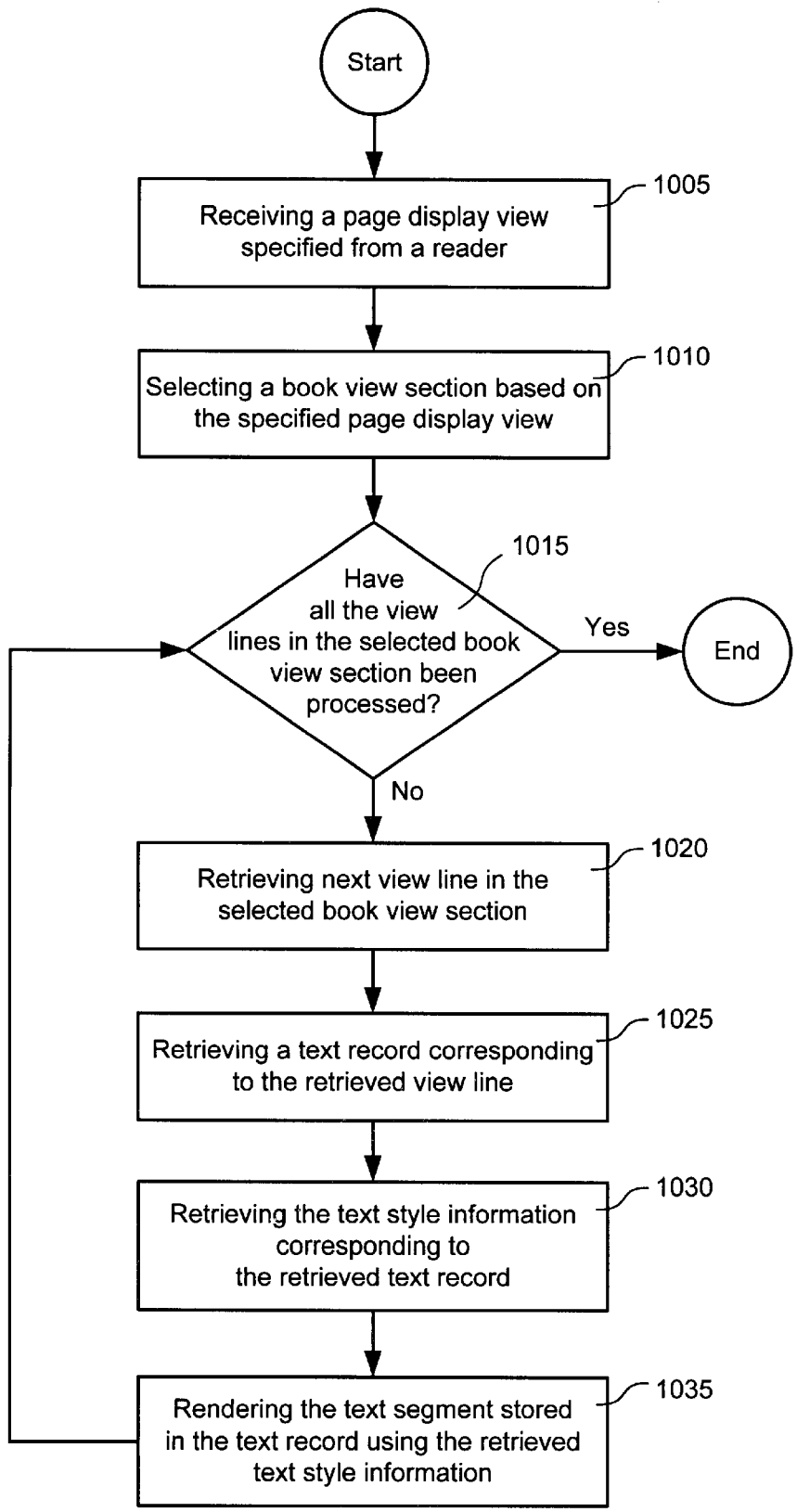
FIG. 10 generally outlines the process of generating page display images from information contained in the ebook binary file in accordance with the current invention.

FIG. 10 generally outlines the process of generating page display images from information contained in the ebook binary file in accordance with the current invention. In block 1005, a user-specified or user-selected page display view is received from the reader or user. A book view in the view information section of the ebook binary file is selected based on the specified or selected page display view (block 1010).

Blocks 1015 to 1035 generally outlines the process of generating page display images based on the selected book view. In block 1020, the next unprocessed view line in the selected book view is retrieved. The text record corresponding to the retrieved view line and the text style information corresponding to the text record are retrieved from the ebook binary file (blocks 1025 and 1030). The text segment contained in the retrieved text record is then rendered or imaged using the text style information corresponding to the text record (1035). Blocks 1020 to 1035 are repeated until all view lines in the selected book view are processed, as shown in query block 1015.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system to distribute electronic publications, comprising:

a document development platform to generate an electronic (ebook) book binary file from one or more source files describing a reading material, the ebook binary file including a plurality of book views, each of the plurality of book views including information needed to generate a plurality of page display images representing content of the reading material in a font having a particular font point size, wherein a first book view and a second book view in the plurality of book views include information needed to generate a plurality of page display images representing identical content of the reading material, wherein at least a portion of the information needed to generate the plurality of page display images representing identical content in the first book view is generated by the document development platform based on the font having the particular font point size associated with the first book view, and at least a portion of the information needed to generate the plurality of page display images representing identical content in the second book view is generated by the document development platform based on the font having the particular font point size associated with the second book view; and an electronic book in communication with the document development platform to receive the ebook binary file, the electronic book parsing the ebook binary file and generating the page display images.

2. The system of claim 1, wherein each of the plurality of page display images is an arrangement of pixels on a display screen to create a visual representation of a page of the reading material.

3. The system of claim 1, wherein the document development platform includes an ebook binary file builder to parse the one of more source files describing the reading material and to generate the ebook binary file.

4. The system of claim 1, wherein the electronic book includes a text rendering engine to parse the ebook binary file and to generate the page display images.

5. The system of claim 1, wherein the ebook binary file includes a plurality of text records, each of the text records includes a text segment.

6. The system of claim 1, wherein each of the plurality of book views includes a plurality of view lines, each of the plurality of view lines includes a frame coordinate and an offset to a corresponding text record.

7. The system of claim 6, wherein each of the plurality of view lines further includes a reference to a corresponding style run record.

8. The system of claim 1, wherein the ebook binary file includes plurality of style records, each of the plurality of style records includes text style information used to render a text segment included in a corresponding text record.

9. The system of claim 8, wherein the text style information includes a font identification, a font face, and a font point size.

10. The system of claim 8, wherein the text style information includes indent and margin information.

11. The system of claim 8, wherein the text style information includes a text foreground color definition and a text background color definition.

12. The system of claim 1, wherein the ebook binary file includes a plurality of style run records, each of the plurality of style run records includes an offset to a corresponding text record and a reference to a corresponding style record.

13. A document development platform, comprising:

a processing unit to execute an electronic book (ebook) binary file builder to generate an ebook binary file from one or more source files describing a reading material, the ebook binary file including a plurality of book views, each of the plurality of book views including information needed to generate page display images representing content of the reading material using a set of view parameters, wherein a first book view and a second book view in the plurality of book views include information needed to generate a plurality of page display images representing identical content of the reading material, wherein at least a portion of the information needed to generate the plurality of page display images representing identical content in the first book view is generated by the ebook binary file builder based on the view parameters associated with the first book view, and at least a portion of the information needed to generate the plurality of page display images representing identical content in the second book view is generated by the ebook binary file builder based on the view parameters associated with the second book view.

14. The document development platform of claim 13, wherein the set of view parameters includes a font point size.

15. The document development platform of claim 13, wherein the set of view parameters includes dimensions of a display screen where the page display images are presented.

16. The document development platform of claim 13, wherein the ebook binary file includes a plurality of text records, each of the text records including a text segment.

17. The document development platform of claim 13, wherein each of the plurality of book views includes a plurality of view lines, each of the plurality of view lines includes a frame coordinate and an offset to a corresponding text record.

18. The document development platform of claim 17, wherein each of the plurality of view lines further includes a reference to a corresponding style run record.

19. The document development platform of claim 13, wherein the ebook binary file includes plurality of style records, each of the plurality of style records includes text style information used to render a text segment included in a corresponding text record.

20. The document development platform of claim 19, wherein the text style information includes a font identification, a font face, and a font point size.

21. The document development platform of claim 19, wherein the text style information includes indent and margin information.

22. The document development platform of claim 19, wherein the text style information includes a text foreground color definition and a text background color definition.

23. The document development platform of claim 13, wherein the ebook binary file includes a plurality of style run records, each of the plurality of style run records includes an offset to a corresponding text record and a reference to a corresponding style record.

24. A method to generate and switch page display views on a portable electronic book, comprising:

generating an ebook binary file from one or more source files describing a reading material, the ebook binary file including a plurality of book views, each of the plurality of book views including information needed to generate page display images representing content of the reading material in a font having a particular font point size, wherein a first book view and a second book view in the plurality of book views include information needed to generate a plurality of page display images representing identical content of the reading material, wherein at least a portion of the information needed to generate the plurality of page display images representing identical content in the first book view is generated by a document development platform based on the font having the particular font point size associated with the first book view, and at least a portion of the information needed to generate the plurality of page display images representing identical content in the second book view is generated by the document development platform based on the font having the particular font point size associated with the second book view; and parsing the ebook binary file and generating the page display images representing content of a reading material.

25. The method of claim 24, further comprising:

providing a plurality of text records in the ebook binary file, each of the text records includes a text segment.

26. The method of claim 24, further comprising:

providing a plurality of view lines in each of the plurality of book views, each of the plurality of view lines includes a frame coordinate and an offset to a corresponding text record.

27. The method of claim 26, further comprising:

providing a reference to a corresponding style run record in each of the plurality of view lines.

28. The method of claim 24, further comprising:

providing a plurality of style records in the ebook binary file, each of the plurality of style records includes text style information used to render a text segment included in a corresponding text record.

29. The method of claim 24, further comprising:

providing a plurality of style run records in the ebook binary file, each of the plurality of style run records includes an offset to a corresponding text record and a reference to a corresponding style record.

30. A computer program embodied on a computer-readable medium, comprising:

an electronic book (ebook) binary file builder to generate an ebook binary file from one or more source files describing a reading material, the ebook binary file including a plurality of book views, each of the plurality of book views including information needed to generate a plurality of page display images representing content of the reading material in a font having a particular font point size, wherein a first book view and a second book view in the plurality of book views include information needed to generate a plurality of page display images representing identical content of the reading material, wherein at least a portion of the information needed to generate the plurality of page display images representing identical content in the first book view is generated by the document development platform based on the font having the particular font point size associated with the first book view, and at least a portion of the information needed to generate the plurality of page display images representing identical content in the second book view is generated by the document development platform based on the font having the particular font point size associated with the second book view.

31. The computer program of claim 30, further comprising:

a text rendering engine to parse the ebook binary file and to generate the page display images.

* * * * *